United States Patent [19]

Wittenberger

[11] 4,358,673

[45] Nov. 9, 1982

[54] STEERED SUM LOW COST AUTO FOCUS SYSTEM

[75] Inventor: John C. Wittenberger, Littleton, Colo.

[73] Assignee: Honeywell Inc., Minneapolis, Minn.

[21] Appl. No.: 212,918

[22] Filed: Dec. 4, 1980

[51] Int. Cl.³ .............................................. G01J 1/36
[52] U.S. Cl. ...................................... 250/204; 354/25
[58] Field of Search ...................... 250/201, 204, 209; 354/25; 356/1, 4

[56] References Cited

U.S. PATENT DOCUMENTS 4,250,377 2/1981 Wilwerding .......................... 250/204
4,309,603 1/1982 Stauffer ............................... 250/204

Primary Examiner—David C. Nelms
Assistant Examiner—Edward P. Westin
Attorney, Agent, or Firm—Charles J. Ungemach

[57] ABSTRACT

Range finding equipment for use with optical systems utilizing a small number of radiation detectors positioned to receive radiation in first and second patterns from a remote object. The sum of the logarithm of the ratio of a first and second detector and the logarithm of the ratio of a third and fourth detector is compared with the difference between the logarithm of the ratio of the first and second detector and the logarithm of the ratio of the third and fourth detector to determine which has the greatest absolute magnitude. The signal of greatest magnitude is selected to operate the range finding circuitry.

14 Claims, 2 Drawing Figures

STEERED SUM LOW COST AUTO FOCUS SYSTEM

BACKGROUND OF THE INVENTION

In U.S. Pat. No. 4,309,603 of Norman L. Stauffer, filed Oct. 17, 1979, a low cost auto focus system is disclosed in which as few as two radiation responsive detector pairs are utilized thus avoiding the necessity for a large and costly detector array that had been common in the prior art at that time. The purpose for this system was to provide an auto focus arrangement for less expensive cameras while still retaining most of the advantages obtained in the prior art. The system utilized the equation $V = |\log a_1/b_2| - |\log a_2/b_1|$ where V is the resultant output and $a_1$, $b_1$, $a_2$ and $b_2$ are the respective outputs of the two pairs of detectors used. This equation operated to produce a summation curve that was normally positive on one side of the proper focus position and negative on the other side of the proper focus position with the zero crossover point representing the position of best focus.

In U.S. Pat. No. 4,250,377 of Dennis J. Wilwerding, filed Nov. 30, 1979, an improvement on the basic low cost auto focus system was disclosed in which a bias signal was introduced to change the position of the output signal by an amount necessary to prevent improper zero crossover situations that could occur under very low contrast conditions.

One difficulty has been encountered in the operation of the above-described inventions and that lies in the fact that the signals $\log a_1/b_2$ and $\log a_2/b_1$ may individually be quite large even near the zero crossover point representing the best focus position. Because of this, the difference amplifiers utilized with respect to the two detector pairs had to be extremely closely matched so that the difference between the absolute values of the log functions, represented by the above equation, can be zero at the proper position. It has been found that providing such closely matched amplifiers is a serious problem in the production of a low cost circuit and accordingly, schemes have been devised in an attempt to utilize amplifiers that are not necessarily exactly matched. One such scheme has been to utilize the equation $|\log a_1/b_1| + |\log a_2/b_2|$ and instead of detecting the zero crossover point, determining the point at which the curve generated by this equation peaks. Such a circuit would avoid the necessity for closely matched amplifiers but introduces the problem of the difficulty of peak detection. Most hand-held cameras cannot be absolutely rigidly positioned during the determination of range and slight motions introduced by the operator cause small peaks to exist along the output curve. When this occurs, most peak detection circuits are unable to determine the difference between a small spurious peak and the actual peak representing best focus.

An alternate solution is disclosed in a copending application of J. Frazier, Ser. No. 212,930, filed Dec. 4, 1980. This system examined the magnitude of the signal $\log a_1/b_1$ to determine if it was greater or lesser than the signal $\log a_2/b_2$ and then, using only the larger signal, to plot a zero crossover point from the expression $V = \log a_1/b_1$ or $V = \log a_2/b_2$. Such an equation operates satisfactorily with large signals but the signal was found to be too small in some cases and furthermore, the information contained in the non-used signal was lost.

SUMMARY OF THE INVENTION

The apparatus of the present invention operates to examine the signals $\log a_1/b_1$ and $\log a_2/b_2$ to determine if they have the same sign or whether they have opposite signs. If these two signals have the same sign, then they are added and if they have the opposite sign, one of them is inverted and then they are added. More particularly, the magnitude of the signal $|\log a_1/b_1 + \log a_2/b_2|$ is compared with the magnitude of the signal $|\log a_2/b_2 - \log a_1/b_1|$ or $|\log a_1/b_1 - \log a_2/b_2|$ and if the former is larger, then the equation $V = \log a_1/b_1 + \log a_2/b_2$ is utilized to determine the zero crossover point but if the latter is larger, then the equation $V = \log a_2/b_2 - \log a_1/b_1$ or $V = \log a_1/b_1 - \log a_2/b_2$ is utilized to determine the zero crossover point. The result is to increase the size of the available output signal and at the same time utilize all of the information gathered from the detectors.

DETAILED DESCRIPTION OF THE PREFERRED EMBODIMENT

Figure 1:
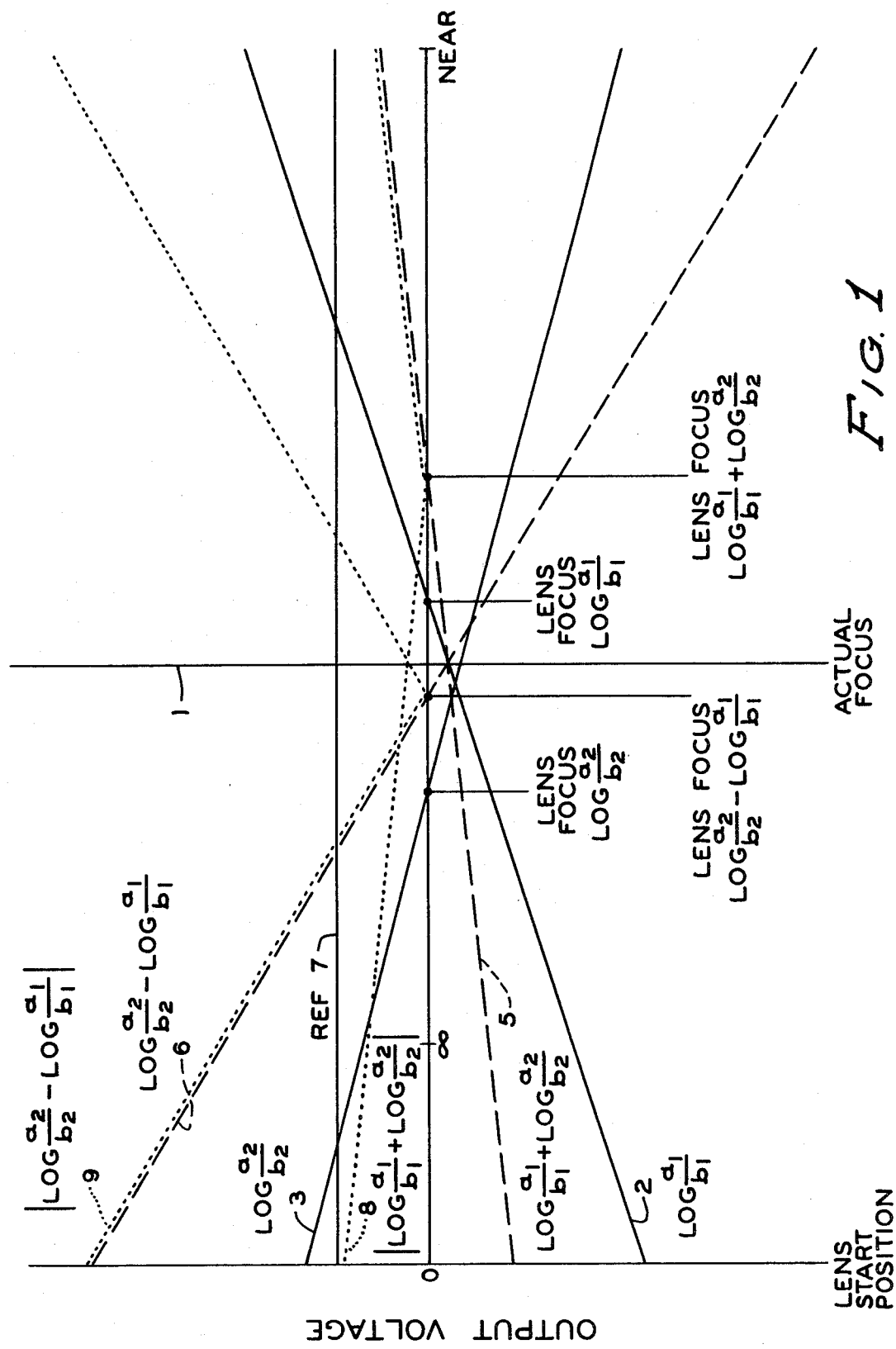
FIG. 1 shows a graph of the various signals involved in the present invention.

In FIG. 1, the output values of various signals are plotted as a function of lens extension from beyond infinity on the left to "near" on the right. A vertical line 1 represents an assumed actual best focus position. A solid line 2 representing an assumed value for $\log a_1/b_1$ is shown extending from a negative value on the left through zero near the actual best focus line 1 to a positive value on the right. This curve, as with the other curves shown in FIG. 1, is shown as a straight line for convenience but in actual practice they may have some curvature. A solid line 3 representing an assumed value for $\log a_2/b_2$ is shown extending from a positive value on the left through a zero crossover point also near the actual best focus line 1 to a negative value on the right. If everything were perfectly matched, the two zero crossover points for curves 2 and 3 would coincide at the actual best focus line 1 but because of mismatch of components, they will normally not do so. While line 2 has been shown starting negative on the left and line 3 shown starting positive on the left, both could be on the same side of zero or opposite to the way they are shown. It should be noted that the line with the greatest slope, line 2, reaches the zero crossover point closer to the actual best focus line 1 than does line 3. It has been found that normally the greater the slope, the more closely the zero crossover point will be to the actual best focus point. Accordingly, if the signals repesented by lines 2 and 3 are of the same sign and are added, there will be even greater slope and greater accuracy. However, if the signs of the signals are opposite, adding them will produce a less accurate output. In such case, the better signal would be the difference between the signals represented by lines 2 and 3.

A dashed curve 5 is shown in FIG. 1 representing the sum $\log a_1/b_1 + \log a_2/b_2$ and it is seen to have less slope than either curve 2 or 3 and to cross the zero axis much further away from the actual best focus line 1.

A dashed curve 6 is also shown in FIG. 1 representing the difference $\log a_2/b_2 - \log a_1/b_1$ and it is seen that this line has greater slope than either line 2 or line 3 and crosses the zero axis nearer to the actual best focus position 1. Throughout the description the difference value will be described as log $a_2/b_2$ − log $a_1/b_1$ although it is equally possible to use the expression log $a_1/b_1$ − log $a_2/b_2$ to represent the difference value. At any rate, it is seen to be desirable in this case to utilize curve 6 to determine where the zero crossover point is for purposes of stopping the camera lens.

A reference voltage shown as solid line 7 is shown in FIG. 1 and represents the value below which, at the lens start position, there is too little contrast to accurately determine best focus. The circuitry of the present invention includes apparatus which is the subject of a copending application Ser. No. 213,437, filed Dec. 5, 1980 and which determines whether there is sufficient contrast by taking the absolute value of the signals log $a_1/b_1$ + log $a_2/b_2$ and log $a_2/b_2$ − log $a_1/b_1$ and comparing them with the reference voltage at the lens start position. If both of the absolute value signals are below the reference voltage, the system will operate to position the camera lens at the infinity or preferably the hyperfocal position. In FIG. 1, dotted line 8 is shown representing the absolute value of log $a_1/b_1$ + log $a_2/b_2$ and it is seen that line 8 falls below the reference voltage and thus would not be usable to determine best focus position. Dotted line 9 is also shown in FIG. 1 and represents the absolute value of log $a_2/b_2$ − log $a_1/b_1$. Line 9 is clearly above the reference value 7 and, in operation, the system will allow focus operation using the largest sum or difference signal which, in this case, is seen to be log $a_2/b_2$ − log $a_1/b_1$. Of course, both lines 8 and 9 may fall above the reference value in which case the system will still pick the largest sum or difference signal for use by the focus circuitry but if neither fall above the reference value, the system will "default" and focus at the infinity or hyperfocal distance. It should also be noted that by allowing the focus lens to start at a position where it would focus on an object further than infinity, as is described in the above-mentioned copending application Ser. No. 212,930, there is a certain amount of movement of the focus lens before the infinity position is reached.

Figure 2:
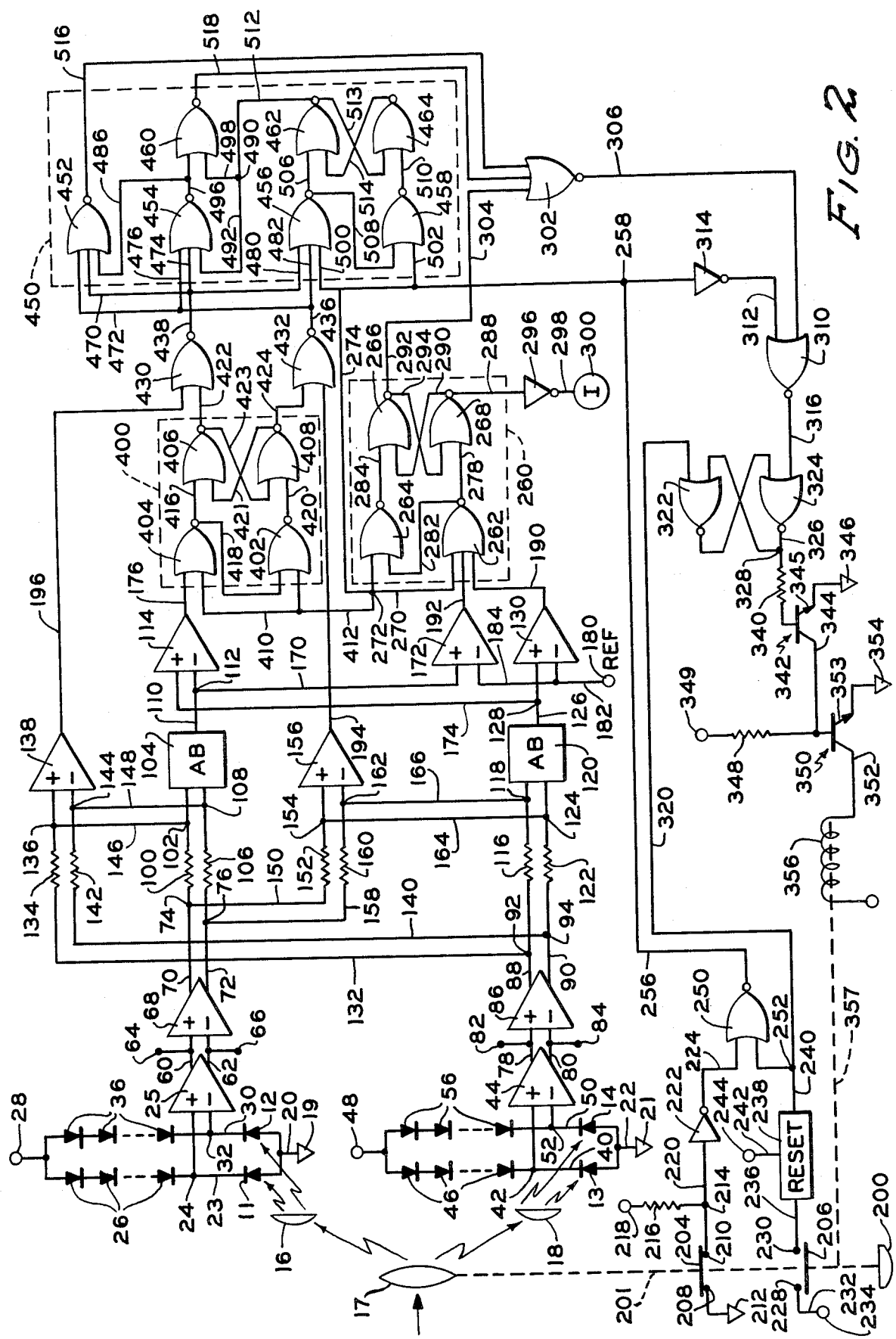
FIG. 2 shows a schematic diagram of the circuit of the present invention.

Turning now to FIG. 2, four radiation responsive detectors 11, 12, 13 and 14 are shown and correspond to the detectors $a_1$, $b_1$, $a_2$ and $b_2$ of the above-mentioned U.S. Pat. No. 4,309,603. Detectors 11 and 12 are mounted behind a first lenslet 16 and receive radiation from a remote object through a moveable focus lens 17 which may be mechanically connected to the camera taking lens as shown in the above-referred to copending application Ser. No. 85,821. The image seen by the detectors 11 and 12 is that of the exit pupil of the focus lens 17 and if such focus lens is at the proper focus position, the amount of radiation received by detector 11 will substantially equal the amount of radiation seen by detector 12. In like manner, detectors 13 and 14 are mounted behind a second lenslet 18 and receive radiation from the remote object through the focus lens 17. The images seen by the detectors 13 and 14 are also of the exit pupil of the focus lens 17 and when such lens is in a proper focus position, the amount of radiation received by detector 13 will substantially equal the amount of radiation seen by detector 14. When the focus lens 17 is not in the proper focus position, the amount of radiation seen by the detectors will normally differ and that seen by the detector 11 will not be equal to that seen by detector 12 nor will that seen by detector 13 be equal to that seen by detector 14. By analyzing the outputs of the four detectors, a signal may be generated to cause the focus lens to be moved to the proper focus position.

In FIG. 2, one side of detectors 11 and 12 are connected together and to a ground connection 19 by a conductor 20. In like manner, one side of detectors 13 and 14 are connected together and to a ground connection 21 by a connector 22. The other side of detector 11 is connected by a conductor 23 to a junction point 24 which is connected as the positive input to a first differential amplifier 25. A plurality of logging diodes 26 are connected in series between a point of positive potential 28 and junction point 24. The purpose of logging diodes 26 is to create a signal at junction point 24 and to the input of amplifier 25 representative of the log of the output of detector 11, that is, log $a_1$. The other side of detector 12 is connected by a conductor 30 to a junction point 32 which is connected to the negative input terminal of amplifier 25. A second plurality of logging diodes 36 are connected between the source of positive potential 28 and the junction point 32. The purpose of logging diodes 36 is to create a signal at junction point 32 and the negative input of amplifier 25 indicative of the logarithm of the signal from detector 12, that is, log $b_1$. In similar fashion, the other side of detector 13 is connected by a conductor 40 to a junction point 42 which is also connected as the positive input to a second differential amplifier 44. A plurality of logging diodes 46 are shown connected between a source of positive potential 48 and junction point 42. The purpose of logging diodes 46 is to produce at junction point 42 and the positive input of amplifier 44 is a signal representative of the logarithm of the magnitude of the output of detector 13, that is, log $a_2$. The other side of detector 14 is connected by a conductor 50 to a junction point 52 which is connected to the negative input terminal of amplifier 44. Another plurality of logging diodes 56 are shown connected between the source of positive potential 48 and junction point 52. The purpose of logging diodes 56 is to produce at junction point 52 and the negative input to amplifier 44 a signal which varies with the magnitude of the logarithm of the output of detector 14, that is, log $b_2$.

Amplifier 25 has a first output 60 which is indicated as positive and a second output 62 which is indicated as negative. The signal between outputs 60 and 62 is representative of the difference between the inputs, that is, the difference between log $a_1$ and log $b_1$ or in other words, is indicative of log $a_1/b_1$. Output 60 is connected to a test point 64 and output 62 is connected to a test point 66 for purposes of aligning the system properly as is described in a copending application Ser. No. 213,438, filed Dec. 5, 1980. Lines 60 and 62 are also connected to the plus and minus inputs respectively of a third differential amplifier 68 to increase the size of the signal for purposes to be used in the remainder of the circuitry. The output of amplifier 68 appears on plus and minus output lines 70 and 72 respectively and the signal between these lines is, like the signal between lines 60 and 62, indicative of the function log $a_1/b_1$. These outputs are connected to junction points 74 and 76 respectively. In similar fashion, amplifier 44 has a first output 78 indicated as positive and a second output 80 indicated as negative. The signal between conductors 78 and 80 is representative of the difference between the inputs, that is, log $a_2/b_2$. Conductor 78 is connected to a test point 82 and conductor 80 is connected to a test point 84 for purposes of alignment.

Conductors 78 and 80 are also connected to the positive and negative inputs of a fourth differential amplifier 86 for purposes of increasing the size of the signal for use by the rest of the circuitry. The output of amplifier 86 appears on plus and minus lines 88 and 90 respectively which in turn are connected to junction points 92 and 94 respectively. The signal between conductors 88 and 90, as with the signal between conductors 78 and 80, is representative of the function $\log a_2/b_2$.

It should be born in mind that the output signal from amplifiers 68 and 86 may be a first or opposite sense depending upon the relative magnitudes of the outputs of the individual detectors. For example, if $a_1$ is greater than $b_1$, then the $\log a_1/b_2$ is positive while if $b_1$ is greater than $a_1$, then the log of $a_1/b_1$ is negative. Likewise, if $a_2$ is greater than $b_2$, then the log of $a_2/b_2$ will be positive while if $b_2$ is greater than $a_2$, then the log of $a_2/b_2$ will be negative.

Junction point 74 is connected through a resistor 100 to a junction point 102 which is connected as one input to an absolute value circuit 104. Junction point 76 is connected through a resistor 106 to a junction point 108 which is connected to another input to the absolute value circuit 104. The output of absolute value circuit 104 is on a conductor 110 connected to a junction point 112 which is the negative input to a comparator 114. Junction point 92 is connected through a resistor 116 to a junction point 118 and to one input of a second absolute value circuit 120. Junction point 94 is connected through a resistor 122 to a junction point 124 which is a second input to the absolute value circuit 120. Absolute value circuit 120 has an output on a conductor 126 connected to a junction point 128 and to the positive input of a comparator 130. Junction point 92 is also connected by a conductor 132 through a resistor 134 to a junction point 136 and the positive input of a comparator 138. Junction point 94 is also connected by a conductor 140 through a resistor 142 to a junction point 144 and the negative input of comparator 138. Junction point 136 is connected to junction point 102 by a conductor 146. Junction point 144 is connected to junction point 108 by a conductor 148. It should be noted that the positive output from differential amplifier 68 is connected through resistor 100 to junction point 102 and the positive output from differential amplifier 86 is connected through resistor 134 to junction point 102. Likewise, the negative output from amplifier 68 is connected through resistor 106 to junction point 108 and the negative output from differential amplifier 86 is connected through resistor 142 to junction point 108. The result is that the sum of the signals from the differential amplifiers 68 and 86 is presented to absolute value circuit 104 and the output on conductor 110 and junction point 112 is representative of $|\log a_1/b_1 + \log a_2/b_2|$.

Junction point 74 is connected by a conductor 150 through a resistor 152 to a junction point 154 and the positive input of a comparator 156. Junction point 76 is connected by a conductor 158 through a resistor 160 to a junction point 162 and to the negative input to comparator 156. Junction point 154 is connected by a conductor 164 to junction point 124 and junction point 162 is connected by a conductor 166 to junction point 118. It should be noted that in this case the positive output of differential amplifier 86 is connected through resistor 116 to junction point 118 while the negative output of differential amplifier 68 is connected through resistor 160 to junction point 118. Likewise, the negative output of differential amplifier 86 is connected through resistor 122 to junction point 124 while the positive output of differential amplifier 68 is connected through resistor 152 to junction point 124. The result is that the difference of the signals from differential amplifiers 86 and 68 is presented to absolute value circuit 120 and the output on conductor 126 and junction point 128 is representative of $|\log a_2/b_2 - \log a_1/b_2|$.

Junction point 112 is also connected by a conductor 170 to the positive input terminal of an comparator 172. Junction point 128 is connected by a conductor 174 to the positive input terminal of comparator 114. Comparator 114 therefore has two inputs, one representative of $|\log a_1/b_1 + \log a_2/b_2|$ and the other representative of $|\log a_2/b_2 - \log a_1/b_1|$. Comparator 114 compares these two signals and operates to produce a signal at its output on conductor 176 which will be a low value or digital "0" if the output of absolute value circuit 104 is greater than the output of absolute value circuit 120 and will be a digital "1" if the output of absolute value circuit 120 is greater than the output of absolute value circuit 104. In other words, if the sum $|\log a_1/b_1 + \log a_2/b_2|$ is larger than the difference $|\log a_2/b_2 - \log a_1/b_1|$, a "0" will appear on conductor 176, but if the difference $|\log a_2/b_2 - \log a_1/b_1|$ is greater than the sum $|\log a_1/b_1 + \log a_2/b_2|$, a "1" will appear on conductor 176.

A source of reference potential at a terminal 180 is presented by a conductor 182 to the negative input terminal of comparator 130 and by a conductor 184 to the negative input terminal of comparator 172. Comparators 130 and 172 operate to compare the signals coming from absolute value circuits 120 and 104 with the reference voltage so as to produce an output signal on lines 190 and 192 respectively. The output signal on line 190 will be a digital "0" if the output from absolute value circuit 120 is less than the reference voltage and will be a digital "1" if the output from absolute value circuit 120 is greater than the reference voltage. Likewise, the signal on line 192 will be a digital "0" if the output from absolute value circuit 104 is less than the reference voltage and will be a digital "1" if the output from the absolute value circuit 104 is greater than the reference voltage.

As previously mentioned, junction point 74 is connected by a conductor 150 through resistor 152 to a junction point 154 which is connected to the positive input terminal of a comparator 156, and junction point 76 is connected by a conductor 158 through a resistor 160 to a junction point 162 which is the negative input terminal of comparator 156. As was also previously mentioned, junction point 124 is connected by a conductor 164 to junction point 154 and the positive input terminal of comparator 156 while junction point 118 is connected by a conductor 166 to junction point 162 which is the negative input terminal of comparator 156. It should again be noted that the positive output terminal of amplifier 68 is connected to the positive input of comparator 156 while the negative output terminal of amplifier 86 is connected to the positive input terminal of comparator 156. Likewise, the negative output terminal of amplifier 68 is connected to the negative input terminal of comparator 156 while the positive output terminal of amplifier 86 is connected to the negative input terminal of comparator 156. Thus, the input of comparator 156 will be the difference between the signals from the output terminals of amplifiers 68 and 86. Comparator 156 has an output on a conductor 194 which will be a digital "1" if the difference between the two inputs is positive and will be a digital "0" if the difference between the two inputs is negative. In other words, if the value of log $a_2/b_2$ − log $a_1/b_1$ is positive, a "1" will appear on conductor 194 but if the log $a_2/b_2$ − log $a_1/b_1$ is negative, then a "0" signal will appear on conductor 194.

In similar fashion, as was previously mentioned, the positive output of amplifier 86 is connected through a resistor 134 to the positive input terminal of a comparator 138 and the positive output of amplifier 68 is connected through resistor 100 to the positive input terminal of comparator 138. Likewise, as also previously mentioned, the negative output of amplifier 86 is connected through resistor 142 to the negative input terminal of comparator 138 and the negative output of amplifier 68 is connected through resistor 106 to the the negative input terminal of comparator 138. In this case, the input to comparator 138 will be the sum of the signals from the output terminals of amplifiers 68 and 86. Comparator 138 has an output on a conductor 196 which will be a digital "1" if the sum of the two inputs is positive and will be a digital "0" if the sum of the two inputs is negative. In other words, if the value of log $a_1/b_1$ + log $a_2/b_2$ is positive, a "1" will appear on conductor 196 but if the log $a_1/b_1$ + log $a_2/b_2$ is negative, a "0" will appear on conductor 196.

In the lower portion of FIG. 2, an actuation button 200 is shown connected to move the focus lens 17 by means of a mechanical connection shown as dashed line 201. As is described in the above-mentioned U.S. Pat. No. 4,309,603 and in the above-mentioned copending application Ser. No. 212,930, when the operator desires to focus and take a picture, he presses button, identified in FIG. 2 by reference numeral 200, which starts moving the lens 17 and the taking lens from their initial starting positions, towards the "near" position. Button 200 is also connected by a mechanical connection 201 to a pair of moveable switch contacts 204 and 206. Switch contact 204 operates between two contact points 208 and 210 to open and close a circuit between a ground connection 212 and a junction point 214. Junction point 214 is connected through a resistor 216 to a source of positive potential 218. Junction point 214 is also connected by a conductor 220 to an inverter 222 which has an output on a conductor 224. Whenever switch contact 204 is closed, a logical "0" is presented from ground connection 212 to the inverter 222 and a logical "1" appears at the output of inverter 222 on conductor 224. Whenever switch contact 204 is open, a logical "1" appears from the source of positive potential 218 through resistor 216 to the input of inverter 222 and a logical "0" appears at the output of inverter 222 on conductor 224.

Switch contact 206 operates between two contacts 228 and 230 respectively. Contact 228 is connected by a conductor 232 to a source of positive potential 234 while switch contact 230 is connected by a conductor 236 to the input of a reset circuit 238. Reset circuit 238 operates upon the initial closure of switch contact 206 to produce a logical "1" on a first output conductor 240, which signal is used to reset various components in the auto focus circuitry to be described, then after a period of three to six milliseconds to produce a logical "0". Reset circuit 238 has a second output 242 that operates whenever the switch contact 206 is closed to supply a positive signal to a terminal 244 which is connected to the power sources for the rest of the system. Thus, when switch contact 206 closes, power is supplied to the rest of the system via conductor 242 and terminal 244 while the output at conductor 240 changes from a "1" to a "0" after three to six milliseconds. The mechanical connection 201 is so arranged that when the operator initially pushes button 200, switch contact 206 will close before switch contact 204 opens. This allows time for power to be supplied to the rest of the system via conductor 242 and terminal 244 and for the default circuitry to determine contrast sufficiency before switch contact 204 is opened. Upon further motion of button 200, switch contact 204 will open thus changing the output of inverter 222 from a "1" to a "0". A NOR gate 250 is shown having a first input connected to the conductor 224 and thus the output of inverter 222 and a second input connected to a junction point 252 that is shown connected to the conductor 240 and thus the output of reset circuit 238. The output of NOR gate 250 appears on a conductor 256 connected to a junction point 258. It is seen that upon operation of sync switch button 200, and before the three to six millisecond delay, the output of reset circuit 238 will be a "1" so that the output of NOR gate 250 will be a "0". After the three to six millisecond delay, the signal on conductor 240, terminal 252 and the lower input to NOR gate 250 will change to a "0". So long as switch contact 204 is closed, however, the output of inverter 222 will be a "1" appearing on conductor 224 and the other input to NOR gate 250 so that the signal on line 256 and terminal 258 will remain a "0". Upon further motion of switch button 200, switch contact 204 will open and a "1" signal will appear to the input of inverter 222 causing a "0" output to the input of NOR gate 250. When this occurs, the signal on conductor 256 and junction point 258 will change to a "1".

A default logic circuit which is the subject of the above-mentioned copending application Ser. No. 213,437 is identified as dashed line box 260 in the center portion of FIG. 2 and consists of four NOR gates identified by reference numerals 262, 264, 266 and 268 respectively. NOR gate 262 has a first input connected to conductor 190 and thus the output of comparator 130 and a second input connected to conductor 192 and thus the output of comparator 172. A third input to NOR gate 262 is connected by means of a conductor 270 to a junction point 272 which in turn is connected by a conductor 274 to junction point 258 and thus the output of NOR gate 250. Recalling that the output of comparator 130 will be a logical "0" whenever the value of the signal from absolute value circuit 120 is less than the signal from reference 180 and the output from comparator 172 will be a "0" whenever the value from absolute value circuit 104 is less than the value from reference circuit 180 the lower two inputs to NOR gate 262 are seen to be indicative of the contrast condition that exists in the scene being viewed. Whenever both absolute value circuit 120 and absolute value circuit 104 produce signals that are less than the reference value 180, then a "low contrast" conditions exists and both of the lower inputs to NOR gate 262 will be a "0" indicative of this low contrast condition. If either the output from absolute value circuit 120 or absolute value circuit 104 are greater than the value of the reference signal from reference circuit 180, then a "1" will exist on at least one of the lower inputs to NOR gate 262. Since the signal appearing at the upper input of NOR gate 262 is a "0" whenever the sync switch member 204 is in a closed condition, if both of the other inputs are also a "0" indicative of a low contrast condition, the output of NOR gate 262 on a conductor 278 will be a logical "1". Conductor 278 is connected by a conductor 282 to the lower input of NOR gate 264 whose other input is connected to junction point 272 and via conductor 274 to junction point 258 and the output of NOR gate 250. Thus, in a low contrast condition, the lower input to NOR gate 264 will be a "1" and its output on a conductor 284 will be a "0". This condition will continue even after the sync switch member 204 is opened since although junction point 272 and the upper input to NOR gate 262 will become a "1" thus changing the output of NOR gate 262 to a "0", the existence of a "1" at the upper input terminal of NOR gate 264 via junction point 272 and conductor 274 will continue to leave a "0" signal on the output of NOR gate 264. Thus, it is seen that after the sync switch button has been depressed to a point closing switch contact 206 and supplying power to the system and before switch contact 204 has been opened, the sensing of a low contrast condition occurs and the output of NOR gate 264 is set at a "0". On the other hand, if either of the amplifiers 130 or 172 produce "1" outputs, indicative of a satisfactory contrast condition, then one of the inputs to NOR gate 262 will be a "1" and the output of NOR gate 262 on conductor 278, conductor 282 and the lower input to NOR gate 264 will be a "0". Under this circumstance, the output of NOR gate 264 will be a "1" before the opening of switch contact 204. As can be seen, the outputs of NOR gates 262 and 264 are connected to a flip-flop consisting of cross-connected NOR gates 266 and 268. If a low contrast condition exists prior to the opening of sync switch contact 204, the output of NOR gate 262 connected to the lower input of NOR gate 268 will be a "1" and the output of NOR gate 268 appearing on conductor 288 will be a "0". The output of NOR gate 268 is connected by a conductor 290 to the other input terminal of NOR gate 266 and, as explained earlier, under low contrast conditions with the output of NOR gate 264 being a "0", the output of NOR gate 266 on a conductor 292 will be a "1". The output conductor 292 is connected by a conductor 294 to the other input of NOR gate 268 and holds the output of NOR gate 268 at a "0" even if the other input to NOR gate 268 changes. Thus, between the time that the power switch contact 202 is closed and before the sync switch contact 204 is opened, a sensing of the contrast condition occurs and the output of NOR gate 266 is set in either a "1" indicative of low contrast or a "0" indicative of good contrast prior to the operation of the auto focus circuitry to be described.

Output conductor 288 is connected to an inverter 296 which has an output on a conductor 298 connected to an indicator 300. Under low contrast conditions, the output from inverter 296 will be a "1" thus providing a signal to the operator at indicator 300 that a low contrast condition exists. Meanwhile, the output of NOR gate 266 on conductor 292 being a "1" is presented to a NOR gate 302 by means of a conductor 304. Whenever a low contrast condition exists, the output on conductor 304 will be a "1" thus causing the output of NOR gate 302 on a conductor 306 to be a "0". Conductor 306 is connected to one input terminal of a NOR gate 310, the other input terminal of which is connected by means of a conductor 312 to the output of an inverter 314 which has its input connected to junction point 258. Before sync switch contact 204 is opened, the signal appearing at junction point 258 and the input to inverter 314 is a "0" and the output of inverter 314 on conductor 312 will be a "1". Under these circumstances, the output of NOR gate 310 on a conductor 316 will be a "0". Also, as previously mentioned, when the power switch 206 is closed, the output of reset circuit 238 on conductor 240 and junction point 252 is, for a period of three to six milliseconds, a "1" and is thereafter a "0". Junction point 252 is connected by means of a conductor 320 to the input of a NOR gate 322. The output of NOR gate 310 on conductor 316 is connected to an input of a NOR gate 324 and NOR gates 322 and 324 operate as a flip-flop which is reset by the temporary "1" signal on conductor 320 so as to produce a "1" output on a conductor 326 and a junction point 328 so long as the output from NOR gate 310 is a "0". This condition will continue to exists so long as the sync switch contact 204 is closed since the output of inverter 314 will be a "1" at such times. The "1" output at junction point 328 is presented through a resistor 340 to the base of an NPN transistor 342 which is therefore made conducting causing the output on its collector 344 to be a "0" by virtue of the connection through the transistor base and the emitter 345 to a ground connection 346. The "0" signal on collector 344 is presented to the base of a second NPN transistor 350 having a connection through a resistor 348 to a source of positive potential 349 which is therefore made nonconducting and the collector 352 of transistor 350 will not be connected through the base and the emitter 353 to a ground connection 354. A focus catch solenoid 356, which operates to stop the motion of the taking lens 17 by means of a mechanical connection shown as dashed line 357 connected to lens moving connection 201, will therefore be rendered inoperable and motion of the taking lens and the focus lens will be allowed. Should the output of the flip-flop comprising NOR gates 322 and 324 change to a "0" thus rendering transistor 342 nonconductive, transistor 350 will be rendered conductive and the solenoid 356 will be connected to ground connection 354 thereby causing it to operate and stop motion of the camera lens. The structure of the solenoid and the camera and focus lenses may be those shown in the above-mentioned U.S. Pat. No. 4,309,603 and Ser. No. 212,930.

When the sync switch contact 204 is subsequently opened, the output of NOR gate 250 will change to a "1" thus producing a "0" at the output of inverter 314 and the upper input of NOR gate 310. If a low contrast condition exists, the output of NOR gate 302 will be a "0" and thus the output of NOR gate 310 will be a "1". Under these circumstances, the output of flip-flop consisting of NOR gates 322 and 324 will change to a "0" thereby rendering transistor 342 nonconductive and transistor 350 conductive thereby actuating the focus catch solenoid at the moment of sync switch closure. This will operate to cause the lens to stop moving at the infinity or, preferably, at the hyperfocal position. If at the time the sync switch 204 is opened sufficient contrast exists, then the signal to the left terminal of NOR gate 302 will be a "0" and the output of NOR gate 302 will either be a "0" or a "1" depending upon the focus logic circuitry to be described hereinafter. Since after the sync switch contact 204 has been opened, the signal to the upper terminal of NOR gate 310 is a "0" and so long as the output of NOR gate 302 is a "1", the flip-flop comprising NOR gates 322 and 324 will produce a "1" output thereby turning on transistor 342 and turning off transistor 350. This condition allows continued motion of the taking and focus lenses. As will be described, when a proper focus condition exists, a "1" signal will be presented to one of the inputs of NOR gate 302 thus causing its output to become a "0" so long as there is proper contrast existing from the default logic circuit at the time of sync switch opening. This "0" signal will allow both inputs to NOR gate 310 to be "0" thus changing the flip-flop circuitry 322 and 324 so as to produce a "0" output thereby turning off transistor 342, turning on transistor 350 and causing the focus catch solenoid to operate stopping the lens at the proper focus position.

The remaining portions of the circuitry will be described on the assumption that the power switch contact 206 has been closed and three to six milliseconds have elapsed thus producing a "0" signal on conductor 320 and the input to NOR gate 322 and that sufficient contrast exists so that the output from the default logic 260 on conductor 304 and the lower input to NOR gate 302 is also a "0".

A channel steering logic circuit shown as box 400 in the upper central portion of FIG. 2 consists of four NOR gates identified as 402, 404, 406 and 408 respectively. The lower input terminals to NOR gates 402 and 404 are connected to junction point 272 by way of conductors 410 and 412 respectively. It will be recalled that junction point 272 has a "0" signal thereon until such time as the sync switch contact 204 is opened at which time a "1" signal will appear on junction point 272. The upper input terminal of NOR gate 404 is connected to conductor 176 and thus the output of comparator 114. It will be recalled that comparator 114 produces a "0" signal whenever the absolute value of log $a_1/b_1$ + log $a_2/b_2$ is greater than the absolute value of log $a_2/b_2$ − log $a_1/b_1$ and a "1" signal whenever the absolute value of log $a_2/b_2$ − log $a_1/b_1$ is greater than the absolute value of log $a_1/b_1$ + log $a_2/b_2$. The purpose of the channel steering logic circuit 400 is to provide a means whereby either the output of comparator 138 or the output of comparator 156 operates to control the focus logic to be described hereinafter. More particularly, if the absolute value of log $a_1/b_1$ + log $a_2/b_2$ is greater than the absolute value of log $a_2/b_2$ − log $a_1/b_1$, then it is desired that the output of comparator 138 representing log $a_1/b_1$ + log $a_2/b_2$ control the focus logic whereas if the absolute value of log $a_2/b_2$ − log $a_1/b_1$ is greater than the absolute value of log $a_1/b_1$ + log $a_2/b_2$, then the output of comparator 156 representing log $a_2/b_2$ − log $a_1/b_1$ should control the focus logic circuitry.

If it is assumed that the output of comparator 114 is a "0" indicating that the absolute value of log $a_1/b_1$ + log $a_2/b_2$ is greater than the absolute value of log $a_2/b_2$ − log $a_1/b_1$ then, NOR gate 404 in the channel steering logic circuit 400 will have both of its input a "0" since the upper input is connected to the output of comparator 114 and the lower input is connected to junction point 272 which, by way of conductors 274, junction point 258 and conductor 256, is connected to the output of NOR gate 250 and thus is a "0" whenever the sync switch contact 204 is closed. The output of NOR gate 404 on a conductor 416 will therefore be a "1" and by a connection 418 the upper input terminal of NOR gate 402 will be a "1". As a result, the output of NOR gate 402 on a conductor 420 will be a "0" which signal is presented to the lower input terminal of NOR gate 408. NOR gate 406 has its lower terminal connected to the output of NOR gate 408 by a conductor 421 and has its upper input terminal connected to conductor 416 and thus the output of NOR gate 404 which at this time is a "1" and accordingly the outut of NOR gate 406 on a conductor 422 will be a "0". This signal is also presented to the upper input terminal of NOR gate 408 by conductor 423 and since NOR gate 408 now receives two inputs which are both "0", its output on a conductor 424 will be a "1". NOR gates 406 and 408 operate as a flip-flop and with the assumption above made, the first output on conductor 422 will be a "0" and the second output on conductor 424 will be a "1". Conductor 422 is connected to the lower input terminal of a NOR gate 430 which has its upper input terminal connected to conductor 196 and thus the output of comparator 138. In similar fashion, conductor 424 is connected to the upper input terminal of a NOR gate 432 which has its lower input terminal connected to conductor 194 and thus the output of comparator 156. With the conditions assumed, that is, the absolute value of log $a_1/b_1$ + log $a_2/b_2$ being greater than the absolute value of log $a_2/b_2$ − log $a_1/b_1$, the "1" signal to the upper input terminal of NOR gate 432 will cause a "0" signal to exist on the output of NOR gate 432 on a conductor 436. This condition will continue regardless of any change in output from comparator 156. Accordingly, the output from comparator 156 will have no affect on the output of NOR gate 432. On the other hand, with the conditions assumed in this example, the input to NOR gate 430 from conductor 422 being a "0" will allow the output of comparator 138 to affect the output of NOR gate 430 on a conductor 438. More particularly, if the output of comparator 138 on conductor 196 is a "1", then the output of NOR gate 430 on conductor 438 will be a "0" but if the output of comparator 138 on conductor 196 were to change to a "0", then the output of NOR gate 430 would change to a "1". Thus, it is seen that with the assumption made, the output of comparator 138 will have an affect on the focus logic to be described whereas the output of comparator 156 will not.

On the other hand, if the output of comparator 114 were to be a "1", indicating that the absolute value of log $a_2/b_2$ − log $a_1/b_1$ was greater than the absolute value of log $a_1/b_1$ + log $a_2/b_2$, then the output of NOR gate 404 on conductor 416 would be a "0" and, prior to the opening of sync switch contact 204, both inputs to NOR gate 402 would be "0" and the output of NOR gate 402 on conductor 420 would be a "1". Under these circumstances, the output of the flip-flop consisting of NOR gates 406 and 408 would reverse and the signal on conductor 422 would be a "1" while the signal on conductor 424 would be a "0". In such event, the output of NOR gate 430 would be a "0" which condition would continue regardless of whether or not the output of comparator 138 on conductor 196 were a "0" or a "1". On the other hand, with a "0" as one input to NOR gate 432, then the output condition of amplifier 156 on conductor 194 would affect the output of NOR gate 432. More particularly, when the output of comparator 156 was a "1", then the output of NOR gate 432 would be a "0" but when the output of comparator 156 changed to a "0", then the output of NOR gate 432 would become a "1". Thus, in the second example assumed, the output of comparator 156 would be operable to control the focus logic to be described. As described above, the signal indicative of log $a_1/b_1$ + log $a_2/b_2$ will cross the zero axis at approximately the point of proper focus whenever that signal is the largest while the signal indicative of log $a_2/b_2$ − log $a_1/b_1$ will cross zero proximate the proper focus position whenever that signal is the largest. By virtue of the channel steering logic box 400, the zero crossover point will either be provided by the output of NOR gate 430 or the output of NOR gate 432 depending upon which of the signals from comparator 138 or 156 is the largest.

The above description of the channel steering logic was with the sync switch closed, thus a "0" is applied to the lower inputs of both gates 402 and 404. When the sync switch opens, a "1" is applied to the lower inputs of both gate 402 and 404. This forces both outputs to be "0" and their previous state which was stored in flip-flop 406 and 408 remain unchanged. Thus, the opening of the sync switch locks the channel steering logic in its state as of sync switch opening.

In the upper right hand portion of FIG. 2, a focus logic circuit is shown identified as dashed line box 450. Focus logic circuitry 450 consists of seven NOR gates identified by reference numerals 452, 454, 456, 458, 460, 462 and 464 respectively. NOR gate 452 has three input connections a first of which is connected to the output of NOR gate 430 and conductor 438 by a conductor 470. A second input to NOR gate 452 is connected to the output of NOR gate 432 and conductor 436 by a conductor 472. NOR gate 454 has three input terminals a first of which is connected to the output of NOR gate 430 and conductor 438 by a conductor 474 and a second of which is connected to the output of NOR gate 432 and conductor 436 by a conductor 476. The third NOR gate 456 likewise has three input terminals a first of which is connected to the output of NOR gate 430 and conductor 438 by a conductor 480 and a second of which is connected to the output of NOR gate 432 and conductor 436 by a conductor 482.

A third input terminal to NOR gate 452 is connected to the output of NOR gate 454 by a conductor 486, and the third input of NOR gate 454 is connected to a junction point 490 by a conductor 492. The output of NOR gate 454 is also connected as an input to a NOR gate 460 by a conductor 496 and junction point 490 is connected as the other input to NOR gate 460 by a conductor 498. The third input to NOR gate 456 is connected to the junction point 258 by a conductor 500. One input of NOR gate 458 is also connected to junction point 258 by a conductor 502. The output of NOR gate 456 on a conductor 506 is connected to the other input terminal of NOR gate 458 by a conductor 508. The output of NOR gate 458 is on a conductor 510 and the conductors 506 and 510 are connected to the input terminals of a flip-flop comprising NOR gates 462 and 464. The output of the flip-flops 462 and 464 is on a conductor 512 which is connected to the junction point 490 comprising the other input terminal of NOR gate 460 and the third input to NOR gate 454. The output of NOR gate 462 is also connected to the other input of NOR gate 464 by a conductor 513 and the output of NOR gate 464 is connected to the other input of NOR gate 462 by a conductor 514. The output of focus logic circuit 450 consists of the output of NOR gate 452 on a conductor 516 and the output of NOR gate 460 on a conductor 518 which are connected to the other two inputs of NOR gate 302.

To understand the operation of focus logic 450, it will be convenient to make several assumptions and note how the outputs change under the conditions of such assumptions. As a first assumption, let the log $a_1/b_1 + \log a_2/b_2$ be positive so that the output from comparator 138 is a "1" and that the absolute value of log $a_1/b_1 + \log a_2/b_2$ is greater than the absolute value of log $a_2/b_2 - \log a_1/b_1$. As explained above, the condition of comparator 138 will be controlling and the output of NOR gate 430 will change when the signal on line 196 moves from a positive to a negative value. With a positive input to NOR gate 430, the output of NOR gate 430 on conductor 438 will be a "0" and, as described above, since NOR gate 432 receives a "1" signal from the flip-flop comprising 406 and 408, the output of NOR gate 432 on conductor 436 will be a "0" which condition will not change even though the output of comparator 156 were to change. Since the outputs of both NOR gates 430 and 432 on conductors 438 and 436 are "0", and since the sync switch contact 204 is initially closed, the input signals to NOR gate 456 will all be "0" and the output of NOR gate 456 on conductor 506 will be a "1". The "1" signal on conductor 506 is presented to the NOR gate 462 thereby causing the output on conductor 512 to be a "0". This "0" signal is presented to junction point 490 so that the three inputs to NOR gate 454 will all be "0". Accordingly, the output of NOR gate 454 will be a "1" which signal will be presented as one input to NOR gate 460 and as one input to NOR gate 452. Accordingly, the output of NOR gate 460 on line 518 and the output of NOR gate 452 on line 516 will both be "0" in which circumstance all three inputs to NOR gate 302 will be "0" and the output of NOR gate 302 on conductor 306 will be a "1". As was explained above, the focus catch solenoid will be inactivated under these circumstances allowing motion of the focus and taking lenses of the camera.

When sync switch contact 204 is opened, and the focus and taking lenses are moving towards the proper focus position from the infinity position, a "1" signal will appear at junction point 258 and thus at the lower two terminals of NOR gates 456 and 458. This will not change the output of the flip-flop consisting of NOR gate 462 and 464 since the output of NOR gate 458 will continue to be a "0" and accordingly, the output of the flip-flop appearing on conductor 512 and junction point 490 will continue to be a "0" as will the output of NOR gates 452 and 460. The function of the flip-flop consisting of gates 462 and 464 is to remember the output state of gate 430 when the sync switch opens. Accordingly, the output of NOR gate 302 will remain a "1" and the focus solenoid catch 356 will remain open. The motion of the focus and taking lenses will continue until such time as proper focus position is reached at which time the value of log $a_1/b_1 + \log a_2/b_2$ will cross zero to a minus value and the output of comparator 318 on conductor 196 will become a "0". At this time, NOR gate 430 will have two zeros as its input and an output on conductor 438 will change to a "1" thereby changing one input to all of the NOR gates 452, 454 and 456. Both NOR gates 452 and 456 previously had one input of a "1" so their outputs do not change but NOR gate 454 had previously had three "0" inputs and accordingly, the output from NOR gate 454 on conductor 496 will change from a "1" to a "0". NOR gate 460 will now have two "0" inputs and accordingly the output on conductor 518 will become a "1" and since NOR gate 302 will now have a "1" input, its output on conductor 306 will change to a "0". So long as the sync switch contact 204 is open, the signal on line 312, which is the other input to NOR gate 310, will remain a "0" and accordingly the change from a "1" to a "0" on the output of NOR gate 302 and conductor 306 will cause the output of NOR gate 310 to change to a "1". This changes the state of the flip-flop consisting of NOR gates 322 and 324 so that the output on conductors 326, junction point 238 and the base of transistor 342 becomes "0". This has the effect of causing the signal on the base of transistor 350 to become "1" at which time transistor 350 conducts and the focus catch solenoid 356 operates to stop the taking and focus lenses at the proper position.

As a second assumption, assume now that the absolute value of log $a_2/b_2$ − log $a_1/b_1$ is greater than the absolute value of log $a_1/b_1$ + log $a_2/b_2$. Under these circumstances, the output of comparator 114 will be a "1" and the output of the flip-flop comprising NOR gates 406 and 408 will reverse so that the lower input to NOR gate 430 is a "1" while the upper input to NOR gate 432 is a "0". Under these circumstances, no change in the output of comparator 138 will have an effect on NOR gate 430 but a change in the output of comparator 156 will cause a change in the output of NOR gate 432. Let it also be assumed that the value of log $a_1/b_1$ − log $a_2/b_2$ is positive while the sync switch contact 204 is closed. Under these circumstances, the output of comparator 156 on conductor 194 and the input to NOR gate 432 will be a "1" with the output of NOR gate 432 on line 436 will be a "0". Again the output of NOR gate 430 on conductor 438 is a "0" as is the signal on junction point 258 comprising the lower signal inputs to NOR gates 456 and 458. Accordingly, NOR gate 456 will have three "0" inputs and the output on conductor 506, which is also the input to NOR gates 462 and 458, will be a "1". The flip-flip consisting of NOR gates 462 and 464 will therefore be set with the output on conductor 512 and junction point 490 being a "0". This produces three "0" inputs to NOR gate 454 so that its output, forming an input to NOR gate 460 and to NOR gate 452, is a "1". Accordingly, the output from NOR gate 452 and from NOR gate 460 will be 37 " and all three inputs to NOR gate 302 will be "0". This, again, will produce a "1" on conductor 306 which, as explained above, operate to produce a "0" at the output of NOR gate 310 and cause the focus catch solenoid 356 to be inactivated allowing motion of the lenses. When sync switch contact 204 now opens, a "1" signal will appear at junction point 258 and at the lower input terminals of NOR gates 456 and 458. This will not change the output of the flip-flop consisting of NOR gates 462 and 464 since the output of NOR gate 458 on conductor 510 remains a "0" and accordingly the lower input terminals for NOR gates 454 and 460 will remain "0" as will the outputs from NOR gates 452 and 460. Accordingly, the output of NOR gate 302 remains a "1" and the focus catch solenoid 356 will remain open allowing motion of the lens. Assume now that log $a_2/b_2$ − log $a_1/b_1$ crosses zero to a minus. At this time, the signal from comparator 156 on conductor 194 becomes a "0" and since the condition of the flip-flop comprising NOR gates 406 and 408 produces a "0" on conductor 424, the output of NOR gate 432 changes to a "1" and thus produces a "1" signal to the upper inputs of NOR gates 452, 454 and the middle input of NOR gate 456. This will not change the output of NOR gate 452 which was previously receiving a "1" input from the output of NOR gate 454 but it will change the output of NOR gate 454 to a "0" thus providing NOR gate 460 with two "0" signals and a "1" output on conductor 518. The change of input to NOR gate 302 from a "0" to a "1" on conductor 518 will change the output on conductor 306 to a "0" thereby changing the output of NOR gate 310 to a "1" which, as explained above, will have the effect of changing the output of flip-flops comprising NOR gates 322 and 324 to a "0" turning off transistor 342, turning on transistor 350 and causing the focus catch solenoid 356 to stop the motion of the lenses at the proper focus position.

In the first assumption, it was assumed that log $a_1/b_1$ + log $a_2/b_2$ was positive while the absolute value of log $a_1/b_1$ + log $a_2/b_2$ was greater than the absolute value of log $a_2/b_2$ − log $a_1/b_1$. Let it now be assumed that log $a_1/b_1$ + log $a_2/b_2$ is negative while the absolute value of log $a_1/b_1$ + log $a_2/b_2$ is greater than the absolute value of log $a_2/b_2$ − log $a_1/b_1$. In this event, the output from comparator 114 on conductor 176 will be a "0" thereby setting the flip-flop consisting of NOR gates 406 and 408 so that the signal on conductor 422 is a "0" while the signal on conductor 424 is a "1". In this situation, as with the first assumption, the output of NOR gate 430 will be controlling the focus logic circuitry but, in this case, the other input to NOR gate 430 from amplifier 318 via conductor 196 is a "0" since log $a_1/b_1$ + log $a_2/b_2$ is a negative value. Thus prior to the opening of sync switch contact 204, the output from NOR gate 430 on conductor 438 is a "1" and all three NOR gates 452, 454 and 456 have an input which is a "1". Under these circumstances, the output of NOR gate 452 and of NOR gate 460 will be a "0" but now because the output of NOR gate 456 is a "0", the flip-flop comprising NOR gates 462 and 464 will be changed and the output on conductors 512, 514 and junction point 490 will be a "1". This causes one input to NOR gates 454 and 460 to be a "1" and the output of NOR gate 460 on conductor 518 will be a "0". Again all three inputs to NOR gate 302 are "0" and accordingly the output on conductor 306 will be a "1" assuring that the output of NOR gate 310 on conductor 316 is a "0" and that the focus catch solenoid 356 will be open allowing the lenses to move.

When the sync switch opens, a "1" will appear at the lower terminals of NOR gates 456 and 458 but the "1" output on conductor 512 will remain. Likewise, the "1" output of NOR gate 302 will remain and while the upper input of NOR gate 310 changes to a "0", the output on conductor 316 remains a "0" and solenoid 356 remains open allowing the lens 17 to move.

Now under the third assumption, assume that log $a_1/b_1$ + log $a_2/b_2$ crosses zero from negative to positive thereby changing the signal output from comparator 138 from a "0" to a "1" on conductor 196 and on the upper input terminal of NOR gate 430. This has the affect of changing the output of NOR gate 430 to a "0" and thereby providing a "0" signal to the upper input terminals of 452 and 454. NOR gate 452 now receives three "0" signals and thus produces a "1" output signal on conductor 516 and the output of NOR gate 302 will become a "0". The "0" signal on conductor 306 is now presented to NOR gate 310 which is also receiving a "0" signal from inverter 314 so long as switch contact 204 is open and therefore a "1" signal will appear at the output of NOR gate 310 on conductor 316. This changes the state of the flip-flop consisting of NOR gates 322 and 324 so that a "0" appears on conductor 326 and the base of transistor 342 thereby shutting this transistor off. Transistor 350 will therefore begin conducting and the focus catch solenoid 356 will close stopping the lenses at the zero crossover point in the same fashion as it did when the signal output from comparator 138 changed from a plus to a minus in assumption one.

It is not believed necessary to go through further examples, it being understood that if log $a_2/b_2$ − log $a_1/b_1$ were minus instead positive at the beginning of the operation as it was in assumption number two and if the absolute value of log $a_2/b_2$ − log $a_1/b_1$ were greater than the absolute value of log $a_1/b_1$ + log $a_2/b_2$, the system would operate to close the focus catch solenoid 356 at the proper focus position when the output of comparator 156 changed from a "0" to a "1" opposite to the way it did in assumption two.

Accordingly, it is seen that I have provided circuitry which will select which of the signals, log $a_1/b_1$ + log $a_2/b_2$ and log $a_2/b_2$ − log $a_1/b_1$ is largest and will operate to use that largest signal to control the focus circuitry and to stop the lens at the proper focus position. Furthermore, it is seen that I have provided a low cost, easily fabricated circuit using modern day technology and solid state circuitry for use in a low cost camera while maintaining a sufficient degree of accuracy for use on low cost cameras. It should be understood that various modifications to the circuitry described in the preferred embodiment may be made by those skilled in the art and I do not wish to be limited by the specific disclosures explained in connection with the preferred embodiment. I intend only to be limited by the following claims.

The embodiments of the invention in which an exclusive property or right is claimed are defined as follows:

1. Apparatus for use in a range finding system comprising:
   first and second pairs of radiation responsive detectors operable to produce output signals $a_1$, $b_1$, $a_2$ and $b_2$ respectively indicative of the radiation each detector receives from a remote object;
   first means connected to said radiation detectors to receive the output signals and operable to produce a first comparison signal indicative of the slope of a line generated by the values of $a_1$ and $b_1$ and a second comparison signal indicative of the slope of a line generated by the values of $a_2$ and $b_2$;
   second means connected to said first means to receive the first and second comparison signals and operable to produce a sum signal representative of the sum of the first and second comparison signals;
   third means connected to said first means to receive the first and second comparison signals and operable to produce a difference signal representative of the difference between the first and second comparison signals; and
   signal steering means connected to said second means and said third means and operable to compare the magnitudes of the sum signal and the difference signal and operable to transmit the sum signal whenever the sum signal is greater than the difference signal and operable to transmit the difference signal whenever the difference signal is greater than the sum signal.

2. Apparatus according to claim 1 wherein the first comparison signal is a function of log $a_1/b_1$ and the second comparison signal is a function of log $a_2/b_2$.

3. Apparatus according to claim 1 wherein the signal steering means includes first absolute value means connected to said second means to produce a first absolute value signal indicative of the absolute value of the sum signal and second absolute value means connected to said third means to produce a second absolute value signal indicative of the absolute value of the difference signal and further includes means to compare the first and second absolute value signals to determine the greater of the sum signal and the difference signal to be transmitted.

4. Apparatus according to claim 1 further including means connected to said signal steering means and operable to produce a resultant signal indicative of the range to the remote object when the transmitted signal reaches a predetermined value.

5. Apparatus according to claim 1 further including reference means connected to said first means and said second means to receive the first and second comparison signals and to produce a default signal when the slope of both the first and second comparison signals are below a predetermined minimum reference value.

6. Apparatus for use with an auto focus system which includes first and second pairs of radiation responsive detectors positioned with respect to moveable lens means to receive radiation therethrough from a remote object to be focused upon, each detector operable to produce an output signal indicative of the radiation received thereby and motive means operable to move the lens means from a first position on one side of the proper focus position to a second position on the other side of the proper focus position, the apparatus comprising:
   first signal processing means connected to the first pair of detectors and operable to produce a first signal indicative of a function of the output signals from the first pair of detectors, the function producing a first curve as the lens means moves from the first position to the second position crossing a reference axis proximate the proper focus position;
   second signal processing means connected to the second pair of detectors and operable to produce a second signal indicative of a function of the output signals from the second pair of detectors, the function producing a second curve as the lens means moves from the first position to the second position crossing the reference axis proximate the proper focus position;
   third signal processing means connected to said first and said second signal processing means and operable to produce a sum signal indicative of the sum of the first and second signals, the sum signal having a first characteristic when the lens is on one side of the proper focus position and a second characteristic when the lens is on the other side of the proper focus position;
   fourth signal processing means connected to said first and second signal processing means and operable to produce a difference signal indicative of the difference between the first and second signals, the difference signal having a first characteristic when the lens is on one side of the proper focus position and a second characteristic when the lens is on the other side of the proper focus position;
   signal comparing means connected to said third and said fourth signal processing means and operable to transmit the sum signal when the magnitude of the sum signal is greater than the magnitude of the difference signal and to transmit the difference signal when the magnitude of the difference signal is greater than the magnitude of the sum signal; and
   means connected to said signal comparing means and to said motive means and responsive to the signal transmitted by said signal comparing means to stop the motive means from further moving the lens when the transmitted signal changes characteristic.

7. Apparatus according to claim 6 wherein the outputs from the first pair of detectors are $a_1$ and $b_1$, the outputs from the second pair of detectors are $a_2$ and $b_2$ and wherein the first signal is indicative of log $a_1/b_1$ and the second signal is indicative of log $a_2/b_2$.

8. Apparatus according to claim 6 wherein the signal comparing means includes absolute value means connected to said third and fourth signal processing means and operable to produce a first absolute value signal indicative of the absolute value of the sum signal and a second absolute value signal indicative of the absolute value of the difference signal and wherein the sum signal is transmitted when the first absolute value signal is greater than the second absolute value signal and the difference signal is transmitted when the second absolute value signal is greater than the first absolute value signal.

9. Range determining apparatus comprising:
   lens means;
   motive means connected to move said lens means to a proper focus position with respect to a remote object, the proper focus position being indicative of the range to the remote object;
   first and second radiation responsive detectors mounted to receive radiation from the remote object through said lens means and operable to produce output signals $a_1$ and $b_1$ indicative of the radiation received thereby, $a_1$ being substantially equal to $b_1$ when said lens means is proximate the proper focus position;
   third and fourth radiation responsive detectors mounted to receive radiation from the remote object through said lens means and operable to produce output signals $a_2$ and $b_2$ indicative of the radiation received thereby, $a_2$ being substantially equal to $b_2$ when said lens means is proximate the proper focus position;
   first signal combining means connected to said first and second radiation responsive detectors to receive the output signals and to produce a first combined signal generated by a combination of $a_1$ and $b_1$ as said lens means moves;
   second signal combining means connected to said third and fourth radiation responsive detectors to receive the output signals and to produce a second combined signal generated by a combination of $a_2$ and $b_2$ as said lens means moves;
   sum means connected to said first and second signal combining means to receive the first and second combined signals and operable to produce a sum signal representative of the sum of the first and second combined signals, the sum signal having a first slope and having a predetermined value when said lens means is at a proper focus position;
   difference means connected to said first and second signal combining means to receive the first and second combined signals and operable to produce a difference signal indicative of the difference between the first and second combined signals, the difference signal having a second slope and having a predetermined value when said lens means is at the proper focus position;
   comparing means connected to said sum means and said difference means to receive the sum and difference signals and to compare the magnitude of the first slope with the magnitude of the second slope, said comparing means operable to transmit to an output that signal having the greater slope; and
   resultant means connected to the output of said comparing means to receive the signal having the greatest slope and operable to produce a resultant signal when the signal having the greatest slope reaches the predetermined value.

10. Apparatus according to claim 9 wherein the sum signal is a function of sum of log $a_1/b_1$ and log $a_2/b_2$, difference signal is a function of the difference between log $a_1/b_1$ and log $a_2/b_2$ and the predetermined value is substantially zero.

11. Apparatus according to claim 9 wherein comparing means includes first absolute value means for producing a first absolute value signal indicative of the absolute value of the sum signal, second absolute value means for producing a second absolute value signal indicative of the absolute value of the difference signal and a comparator to determine the greatest of the first and second absolute value signals when said lens means is in a predetermined position.

12. Apparatus according to claim 9 further including stopping means connected to said resultant means and to said motive means and operable to stop said lens means upon receipt of the resultant signal.

13. Apparatus according to claim 9 further including reference means connected to said first and second signal combining means and operable to produce a default signal when neither the sum signal nor the difference signal has a slope greater than a predetermined slope; and
   means connecting the reference means to said resultant means so that said resultant means produces a resultant signal upon receipt of the default signal.

14. Apparatus according to claim 13 further including stopping means connected to said resultant means and to said motive means and operable to stop said lens means upon receipt of the resultant signal.

* * * * *